(12) United States Patent
Chen

(10) Patent No.: US 8,025,410 B2
(45) Date of Patent: Sep. 27, 2011

(54) PROJECTION DEVICE PROVIDING REDUCED SPECKLE CONTRAST

(75) Inventor: Chiu-Ping Chen, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 431 days.

(21) Appl. No.: 12/406,927

(22) Filed: Mar. 18, 2009

(65) Prior Publication Data

US 2010/0053561 A1    Mar. 4, 2010

(30) Foreign Application Priority Data

Aug. 27, 2008    (CN) .......................... 2008 1 0304247

(51) Int. Cl.
- G03B 21/28 (2006.01)
- G02B 13/20 (2006.01)
- G02B 5/02 (2006.01)
- G02B 6/00 (2006.01)
- G03H 1/02 (2006.01)
- H02N 2/00 (2006.01)
- H03B 5/30 (2006.01)

(52) U.S. Cl. .............. 353/31; 353/98; 353/50; 353/122; 353/81; 359/707; 359/28; 359/599; 385/133; 310/311; 331/155

(58) Field of Classification Search ................... 353/31, 353/98, 50, 122, 81; 359/707, 28, 599; 385/133; 310/311; 331/155
See application file for complete search history.

(56) References Cited

U.S. PATENT DOCUMENTS

| | | | |
|---|---|---|---|
| 4,155,630 A * | 5/1979 | Ih ................................. | 359/707 |
| 7,866,831 B2 * | 1/2011 | Kasazumi et al. ............. | 353/98 |
| 2011/0002019 A1 * | 1/2011 | Routley et al. ................... | 359/9 |

* cited by examiner

Primary Examiner — Georgia Y Epps
Assistant Examiner — Magda Cruz
(74) Attorney, Agent, or Firm — Altis Law Group, Inc.

(57) ABSTRACT

A projection device includes a diffuser and a light source system. The light source system includes a light source, a dichroic element, an actuator, and a reflector. The light source generates a light beam that is directed to the dichroic element. The dichroic element forms first and second individual light beams from the light beam. The first individual light beam is transmitted to the diffuser. The second individual light beam is reflected from the reflector to the diffuser. The actuator is fixed to the reflector and has a removal frequency exceeding 20 Hz.

16 Claims, 2 Drawing Sheets

PROJECTION DEVICE PROVIDING REDUCED SPECKLE CONTRAST

BACKGROUND

1. Technical Field

The disclosure relates to projection, and, particularly, to a projection device providing reduced speckle contrast.

2. Description of the Related Art

In laser projectors, speckles of an image occur due to the employment of laser light sources. The speckles can mask part or all image information, negatively affecting the users' viewing experience. Speckles may cause the user vision uncomfortably.

Therefore, it is desirable to provide a projection device which can overcome the described limitations.

BRIEF DESCRIPTION OF THE DRAWINGS

Many aspects of the disclosure can be better understood with reference to the drawings. The components in the drawings are not necessarily drawn to scale, the emphasis instead being placed upon clearly illustrating the principles of the projection device. Moreover, in the drawings, like reference numerals designate corresponding parts throughout the several views.

DETAILED DESCRIPTION

Embodiments of the projection device are described in detail here with reference to the drawings.

Figure 1:
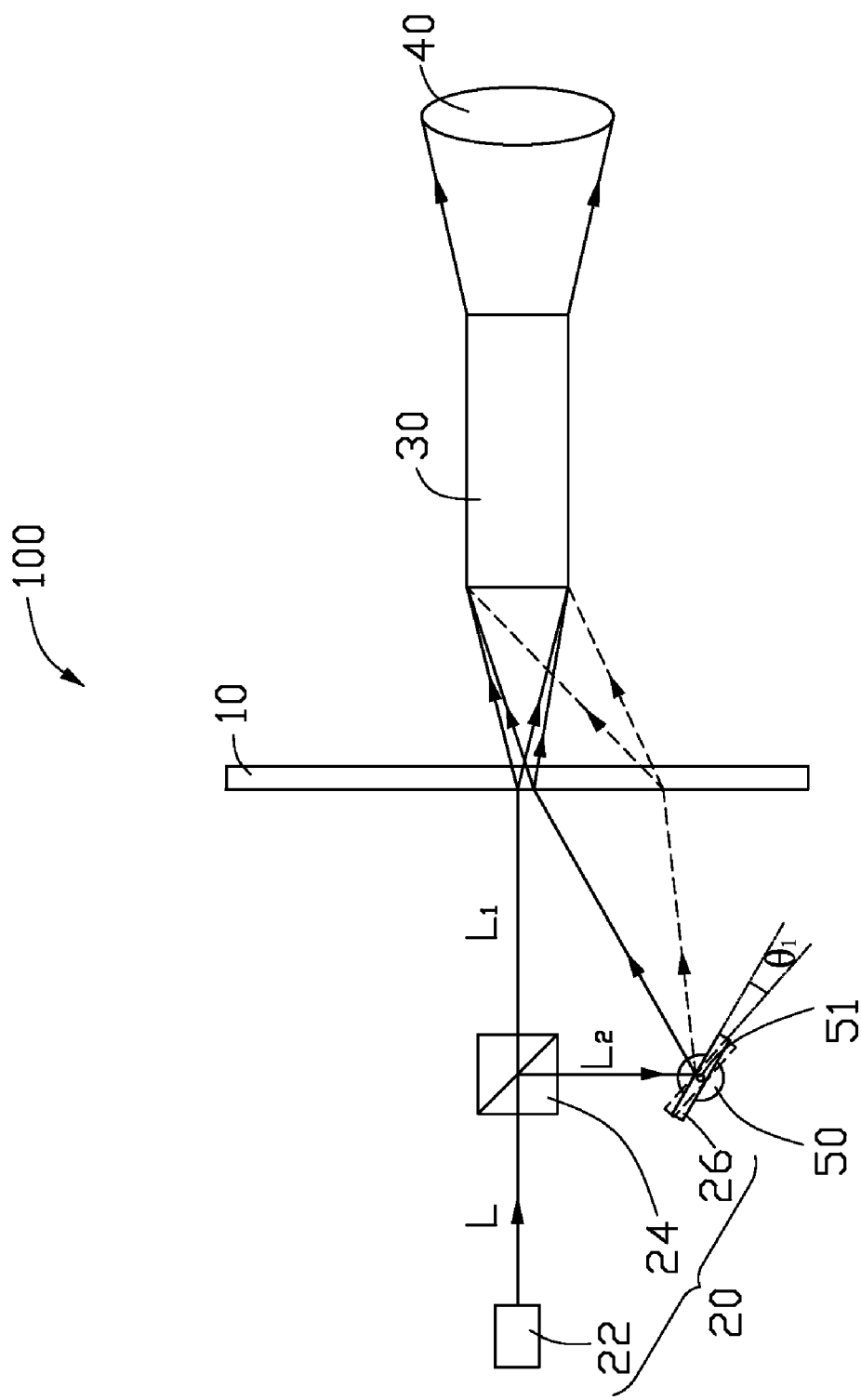
FIG. 1 is a schematic view of a first embodiment of a projection device according to the disclosure.

As shown in FIG. 1, a projection device 100 of a first embodiment includes a diffuser 10, a light source system 20, a light tunnel 30, an illumination system 40, and an actuator 50. The light source system 20 includes a light source 22, a dichroic device 24, and a reflector 26.

The light source 22, emitting a light beam L along a first light path, can be a laser diode. The intensity ratio of the first light beam $L_1$ to the second light beam $L_2$ can be preset depending on requirements.

The dichroic device 24 is positioned in the first light path to diverge the light beam into a first light beam $L_1$ and a second light beam $L_2$. The first light beam $L_1$ is directed to transmit along the first light path. The second light beam $L_2$ is directed to transmit along to a second light path, which can be substantially perpendicular to the first light path. The reflector 26 is arranged to reflect the second light beam $L_2$ to the diffuser 10.

The actuator 50 may have a motor and include a driving rod 51. The driving rod 51 is fixed to the reflector 26, to drive the reflector 26 to rotate. In this embodiment, the actuator 50 is a piezoelectric (PZT) actuator. The reflector 26, having a distal end fixed to the actuator 50 can be rotated by the actuator 50 within a range of a predetermined angle $\theta_1$, such as 5°, to filter portion of the second light beam $L_2$ of frequency exceeding 20 Hertz (Hz). The reflector 26 can be sized so that when the driving rod 51 is fixed to the center of the reflector 26, the distal end of the reflector 26 moves within an arc from 0 to 1 mm.

The diffuser 10, between the light source system 20 and the light tunnel 30, diffuses the first light beam $L_1$ and the second light beam $L_2$.

The light tunnel 30 normalizes the individual light beams $L_1$, $L_2$, thereby providing uniform brightness.

The illumination system 40 can include a plurality of lenses. The illumination system 40 receives the individual light beams $L_1$, $L_2$, and projects the optical images to a screen (not shown).

Figure 2:
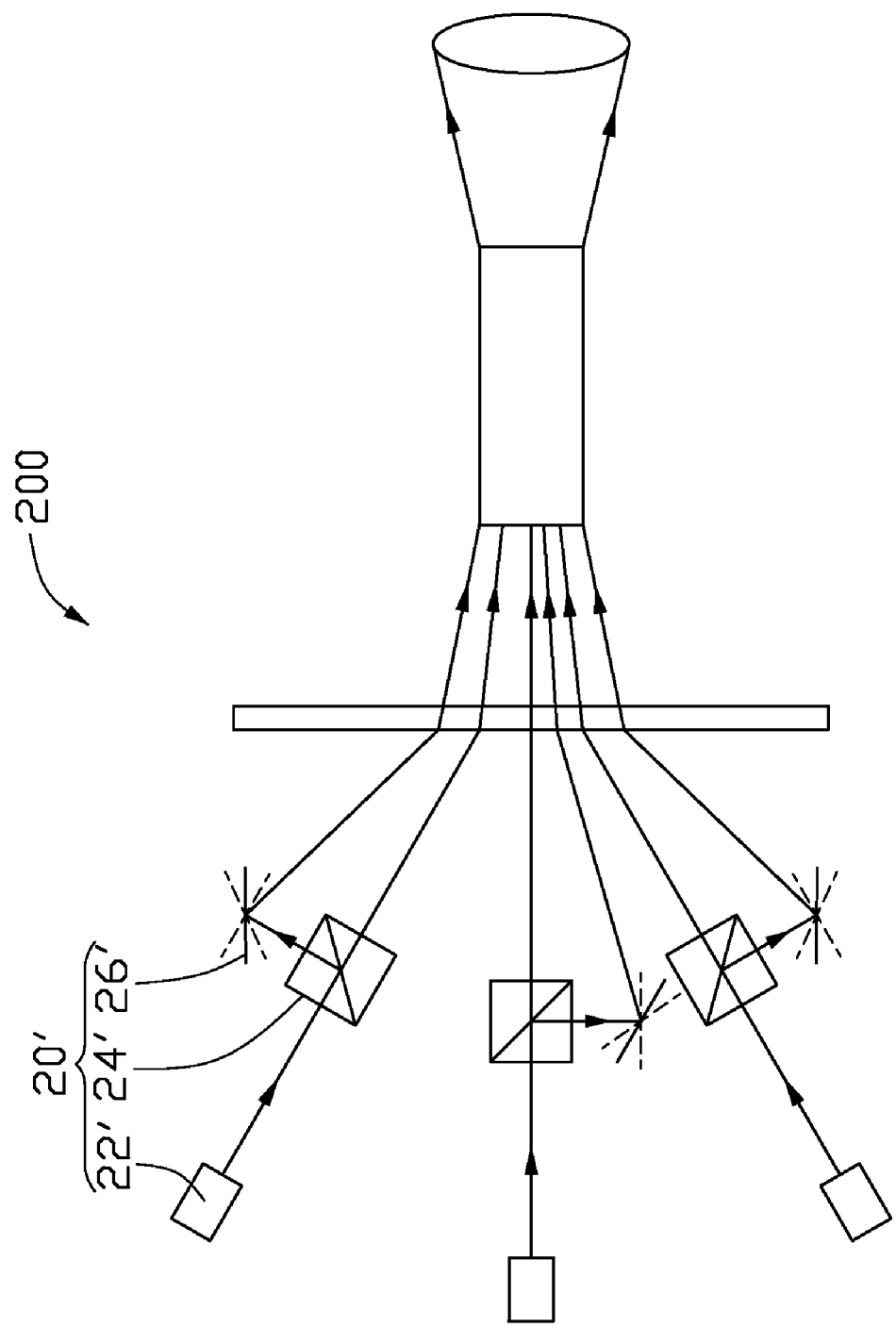
FIG. 2 is a schematic view of a second embodiment of a projection device, according to the disclosure.

In FIG. 2, a projection device 200 of a second embodiment is shown, differing from the projection device 100 in the inclusion of three different light source systems 20'.

The three different light source system 20' includes three light sources 22', three dichroic devices 24' and three reflective mirrors 26'. The three light sources 22' generate three different colored light beams to the diffuser 10.

The projection devices 100, 200 provide the reflector 26 with removal of frequencies exceeding 20 Hz, whereby speckle contrast from the first and second individual light beams $L_1$, $L_2$ is removed more than 20 Hz. As a result, the speckle contrast is reduced.

While the disclosure has been described by way of example and in terms of preferred embodiment, it is to be understood that the disclosure is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A projection device, comprising:
   a diffuser; and
   a light source system, comprising
   a light source;
   a dichroic element;
   an actuator; and
   a reflector;
   wherein the light source is capable of generating a light beam that is directed to the dichroic element; the dichroic element is capable of forming first and second individual light beams from the light beam; the first individual light beam is transmitted to the diffuser, and the second individual light beam is reflected from the reflector to the diffuser; the actuator is fixed to the reflector and has a removal frequency exceeding 20 Hz.

2. The projection device of claim 1, wherein the reflector has a distal end fixed to the actuator and rotates within a predetermined angle.

3. The projection device of claim 2, wherein the predetermined angle is between 0° and 5°.

4. The projection device of claim 1, wherein the actuator comprises a driving rod.

5. The projection device of claim 4, wherein the center of the reflector is fixed to the driving rod and the distal ends of the reflector moves within a predetermined distance.

6. The projection device of claim 5, wherein the predetermined distance is from 0 to 1 mm.

7. The projection device of claim 1, wherein the actuator is a piezoelectric actuator.

8. The projection device of claim 1, further comprising a light tunnel normalizing the light beam from the diffuser.

9. A projection device comprising:
   a diffuser;
   a light source system comprising a light source, a dichroic mirror, and a reflector; the light source is capable of generating a light beam that is directed to the dichroic element, the dichroic element is capable of forming first and second individual light beams from the light beam; the first individual light beam being transmitted to the diffuser; the second individual light beam being reflected from the reflector to the diffuser; and an actuator fixed to the reflector and having a removal frequency exceeding 20 Hz.

10. The projection device of claim 9, wherein the reflector has a distal end fixed to the actuator and rotates within a predetermined angle.

11. The projection device of claim 10, wherein the predetermined angle is between 0° and 5°.

12. The projection device of claim 9, wherein the actuator comprises a driving rod.

13. The projection device of claim 12, wherein the center of the reflector is fixed to the driving rod and the distal end of the reflector moves within a predetermined distance.

14. The projection device of claim 13, wherein the predetermined distance is from 0 to 1 mm.

15. The projection device of claim 9, wherein the actuator is a piezoelectric actuator.

16. The projection device of claim 9, further comprising a light tunnel capable of normalizing light from the diffuser.

* * * * *